United States Patent
MacBain et al.

(10) Patent No.: US 7,615,299 B2
(45) Date of Patent: Nov. 10, 2009

(54) METHOD AND APPARATUS FOR THERMAL, MECHANICAL, AND ELECTRICAL OPTIMIZATION OF A SOLID-OXIDE FUEL CELL STACK

(75) Inventors: John A. MacBain, Carmel, IN (US); Sean M. Kelly, Pittsford, NY (US); Christopher Mergler, West Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 774 days.

(21) Appl. No.: 11/046,251

(22) Filed: Jan. 28, 2005

(65) Prior Publication Data

US 2006/0172176 A1 Aug. 3, 2006

(51) Int. Cl.
H01M 8/04 (2006.01)
H01M 8/00 (2006.01)
H01M 8/10 (2006.01)
H01M 2/14 (2006.01)

(52) U.S. Cl. ............... 429/26; 429/13; 429/24; 429/32; 429/38

(58) Field of Classification Search .......... None
See application file for complete search history.

(56) References Cited

U.S. PATENT DOCUMENTS

| | | | |
|---|---|---|---|
| 4,640,873 A | 2/1987 | Tajima et al. | |
| 5,413,878 A * | 5/1995 | Williams et al. | ............ 429/16 |
| 5,518,828 A | 5/1996 | Senetar | |
| 6,033,794 A | 3/2000 | George et al. | |
| 6,186,254 B1 * | 2/2001 | Mufford et al. | ............ 180/65.3 |
| 6,294,278 B1 | 9/2001 | Wohr et al. | |
| 2004/0081872 A1 * | 4/2004 | Herman et al. | ............ 429/26 |

FOREIGN PATENT DOCUMENTS

DE 10256281 6/2004

(Continued)

OTHER PUBLICATIONS

Human translation of JP 59149670, Takahashi Hideomi, Aug. 27, 1984.*

(Continued)

*Primary Examiner*—Dah-Wei D Yuan
*Assistant Examiner*—Kwang Han
(74) *Attorney, Agent, or Firm*—Paul L. Marshall (57) ABSTRACT

A solid-oxide fuel cell stack assembly comprising a plurality of sub-stacks, preferably two sub-stacks each containing one-half the total number of fuel cells. Cathode air and fuel gas are passed through the first sub-stack, wherein they are partially reacted and also heated. The exhaust cathode air and the exhaust fuel gas from the first sub-stack are directed to the respective inlets of the second sub-stack, becoming the supply cathode air and fuel gas therefor. A first heat exchanger in the flow paths between the sub-stacks and a second heat exchanger ahead of the sub-stacks can help to balance the performance of the two stacks. The result of dividing the number of cells into a plurality of sub-stacks, wherein the exhaust of one sub-stack becomes the supply for the next sub-stack, is that fuel efficiency and utilization are improved, thermal stresses are reduced, and electrical power generation is increased.

17 Claims, 9 Drawing Sheets

FOREIGN PATENT DOCUMENTS

| | | |
|---|---|---|
| EP | 0692835 | 1/1996 |
| JP | 59149670 * | 8/1984 |

OTHER PUBLICATIONS

EG&G Services Parsons, Inc., Science Applications International Corporation, Fuel Cell Handbook (Fifth Edition), Oct. 2000, pp. 9-50 thru 9-53 and 9-70 thru 9-74; U.S. Department of Energy, Office of Fossil Energy, National Energy Technology Laboratory, Morgantown, West Virginia, USA.

European Search Report for 06075099.9.

Wilmer J.G. et al., "Molten Carbonate Fuel Cell Networks: Principles, Analysis and Performance".

Aerospace Power, Conversion Technology, Electrochemical Conversion. Atlanta, Aug. 8-13, 1993.

Proceedings of the Intersociety Energy Conversion Engineering Conference (IECEC), New York, IEEE.

US, vol. vol. 1 Conf. 28, Aug. 8, 1993 pp. 11241-11247, XP000428392.

* cited by examiner

METHOD AND APPARATUS FOR THERMAL, MECHANICAL, AND ELECTRICAL OPTIMIZATION OF A SOLID-OXIDE FUEL CELL STACK

This invention was made with Government support under DE-FC26-02NT41246 awarded by DOE. The Government has certain rights in this invention.

TECHNICAL FIELD

The present invention relates to fuel cells; more particularly, to solid-oxide fuel cells; and most particularly, to arrangements for optimizing the operating conditions, longevity, efficiency, fuel utilization, and electrical output of a solid-oxide fuel cell stack.

BACKGROUND OF THE INVENTION

Fuel cells for combining hydrogen and oxygen to produce electricity are well known. A known class of fuel cells includes a solid-oxide electrolyte layer through which oxygen anions migrate; such fuel cells are referred to in the art as "solid-oxide" fuel cells (SOFCs).

In some applications, for example, as an auxiliary power unit (APU) for a transportation application or a stationary power unit (SPU) for a stationary application, an SOFC is preferably fueled by "reformate" gas, which is the effluent from a catalytic liquid or gaseous hydrocarbon oxidizing reformer, also referred to herein as "fuel gas". Reformate typically includes amounts of carbon monoxide (CO) as fuel in addition to molecular hydrogen. The reforming operation and the fuel cell operation may be considered as first and second oxidative steps of the hydrocarbon fuel, resulting ultimately in water and carbon dioxide. Both reactions are preferably carried out at relatively high temperatures, for example, in the range of 700° C. to 1000° C.

A complete fuel cell stack assembly includes a plurality of fuel cells, for example, 60 cells in the form of sub-assemblies, and a plurality of components known in the art as interconnects which electrically connect the individual fuel cell sub-assemblies in series electrically. Typically, the interconnects include a conductive foam or weave disposed in the fuel gas and air flow spaces adjacent the anodes and cathodes of the fuel cells.

In known prior art fuel cell stack assemblies, each subassembly contains porting which, when joined to the porting of adjacent subassemblies, creates a supply manifold and an exhaust manifold for both the cathode air to the plurality of cathodes and the fuel gas to the plurality of anodes. Thus, all of the cathodes are in parallel pneumatic flow and all of the anodes are in parallel pneumatic flow. The total air is divided among the plurality of cathodes such that each increment of air passes over only a single cathode and then is collected in the air exhaust manifold. Similarly, the total fuel gas entering the stack assembly is divided among the plurality of anodes such that each increment of fuel gas passes over only a single anode and is then collected in the fuel gas exhaust manifold. This flow scheme is sensitive to uneven flow distribution at low anode flow rates. Generally, only a portion of the fuel cell gas is consumed, or utilized, in the single pass through the stack. High fuel utilization is desirable for high system efficiency; however, stack power density decreases with increasing fuel utilization due to fuel gas concentration gradients in the SOFC stack.

Air entering a prior art SOFC stack assembly at ambient temperature must be pre-heated to accommodate and regulate the temperature of the SOFC stack; and to this end, it is known to pass the incoming air through a cathode air heat exchanger immediately ahead of the fuel cells using hot exhaust air as the heat source, thus increasing the thermal efficiency of the system (recuperation). Also, the fuel gas is typically formed in a hydrocarbon reformer and thus may exit the reformer at about 650° C., although both the fuel gas and the cathode air are desirably substantially hotter than 650° C. for optimum fuel consumption and electrical generation (stack efficiency).

Another area of concern in prior art fuel cell stack assemblies is the temperature rise through the stack, the hydrogen/oxygen reaction being highly exothermic. High temperature gradients produce high stresses within the stack and can reduce stack durability. Temperature gradients through the traditional stack may be reduced through increased cathode air massflow, but this results in reduced air utilization for the fuel cell system and a resulting loss of system efficiency.

What is needed in the art is a means for increasing the fuel efficiency of the fuel cell system and electrical output of an SOFC stack assembly.

What is further needed in the art is a means for decreasing thermal stresses within a stack assembly, thereby improving stack durability, without reducing system air utilization and decreasing system efficiency.

It is a principal object of the present invention to increase the electrical output of an SOFC multi-cell stack of a given size.

It is a further object of the present invention to increase the fuel efficiency of an SOFC stack module.

It is a still further object of the present invention to extend the working lifetime of an SOFC stack assembly.

It is a still further object of the present invention to reduce thermal stresses in the SOFC stack, without reducing system air utilization, or for a given thermal stress on the SOFC stack, increase system utilization.

SUMMARY OF THE INVENTION

Briefly described, a solid-oxide fuel cell stack assembly comprising a plurality of individual fuel cell sub-assemblies is divided into a plurality of sub-stacks, preferably two sub-stacks each containing one-half of the fuel cell sub-assemblies. Other divisions of the stack into sub-stacks and apportionments of the cells into sub-stacks are comprehended by the invention. Cathode air and fuel gas are passed conventionally through the first sub-stack, wherein they are partially consumed and also heated. The exhaust cathode air and the exhaust fuel gas from the first sub-stack are directed to the respective inlets of the second sub-stack, becoming the supply cathode air and fuel gas therefor. This allows a second pass of the fuel gas, thereby increasing fuel efficiency. A heat exchanger in the air and fuel flow paths between the sub-stacks can be used to adjust gas temperatures to help balance the performance of the two stacks. For example, heat can be stripped from the inter-stack air and fuel gas and, via a second heat exchanger disposed ahead of the first sub-stack, can further preheat the air and fuel gas entering the first sub-stack, thereby improving the efficiency of the first sub-stack and making the operating condition of the two sub-stacks more nearly alike. Alternatively, the stripped heat may be exhausted to the environment to bring the operating temperature of the second sub-stack closer to the temperature of the first sub-stack.

The two or more substacks connected by series flow of anode and cathode gasses can be connected electrically in series, parallel, or run electrically independent from one another with separate controls as, for example, separate electronics to control the current or voltage of each substack independently.

A sub-stack module in accordance with the invention comprises first and second sub-stacks arranged in flow series as just described with a first heat exchanger between the stacks and a second heat exchanger ahead of the first stack. A plurality of sub-stack modules may be ganged in flow parallel and connected in electrical series to provide any desired electrical voltage. There can also be connected electrically in parallel or be run electrically independent from one another. In such arrangements, it can be useful to provide an auxiliary cooling unit whose output is controllably divided as by a plenum and valving among the plurality of modules such that the thermal operating conditions of all sub-stacks and all modules are optimal.

The result of dividing the number of cells into a plurality of stacks, wherein the exhaust of one stack becomes the supply for the next stack, is that fuel efficiency is improved, thermal stresses are reduced, electrical power generation is increased, and configurational flexibility is enhanced.

BRIEF DESCRIPTION OF THE DRAWINGS

The present invention will now be described, by way of example, with reference to the accompanying drawings, in which.

DESCRIPTION OF THE PREFERRED EMBODIMENTS

Figure 1:
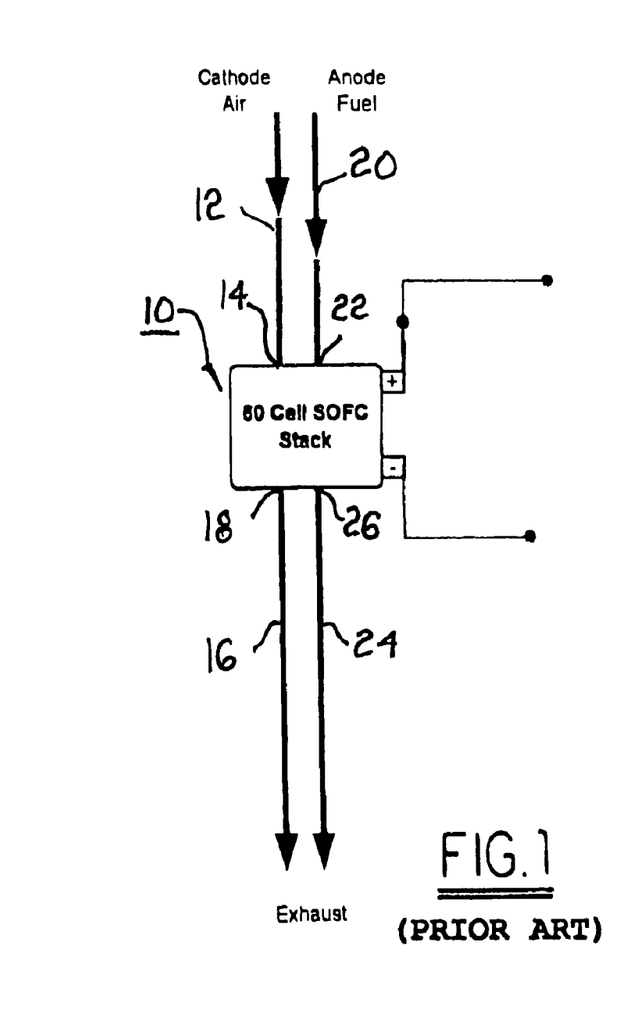
FIG. 1 is a schematic drawing of a prior art multiple-cell fuel cell stack arrangement wherein the cathode air and anode gas flow to the multiple cells in series.
Figure 1A:
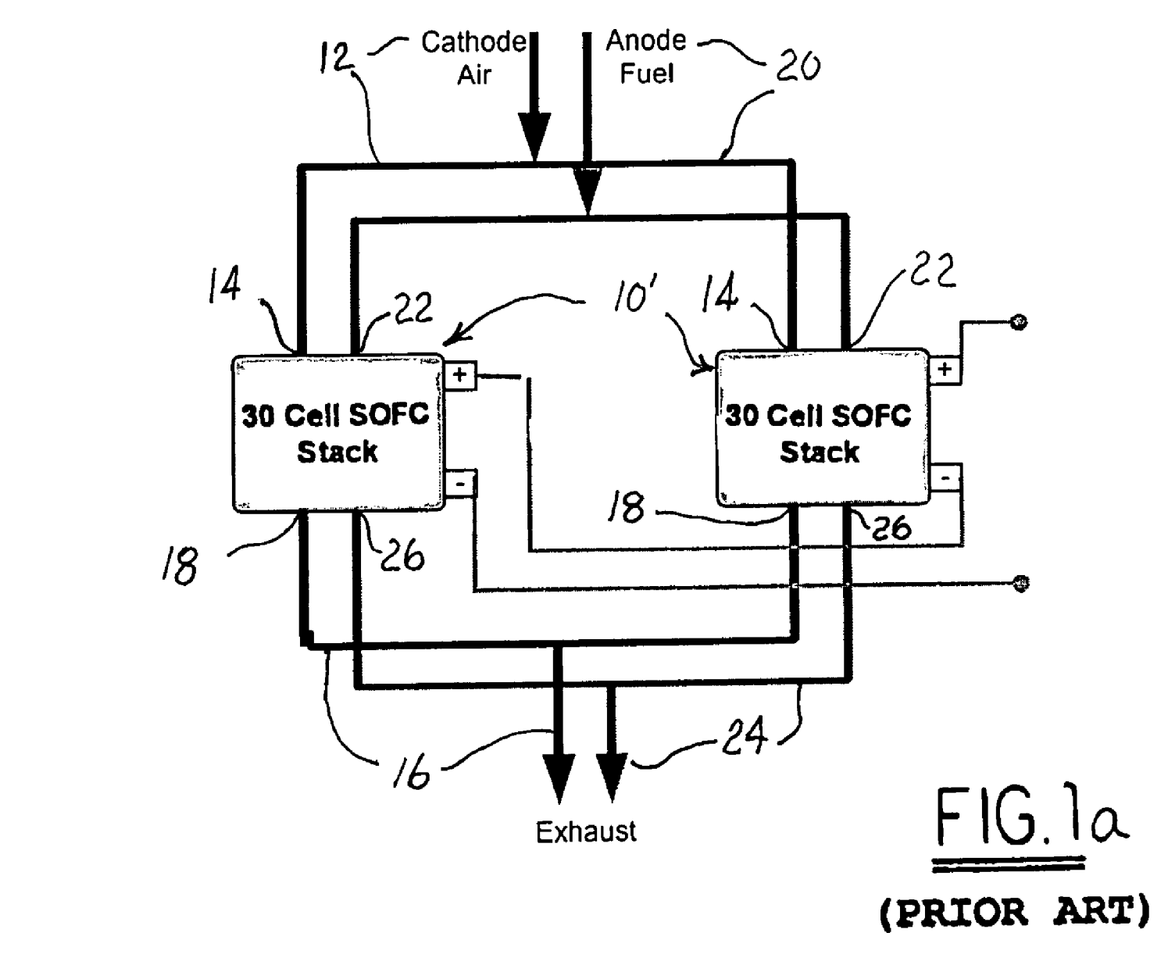
FIG. 1a is a schematic drawing of a prior art multiple-substack arrangement wherein the cathode air and anode gas flow to the multiple cells in each substack in series and to the multiple-substacks in parallel.

Referring to FIG. 1, a prior art solid-oxide fuel cell stack 10 contains a plurality of individual fuel cells (not visible in FIG. 1) arranged in flow parallel and electrical series, as is well known in the fuel cell art. FIG. 1a shows an alternate prior art multiple-substack arrangement having fuel cell sub-stacks 10' wherein, like stack 10 in FIG. 1, each substack contains a plurality of fuel cells arranged in parallel flow. Substacks 10' are arranged in parallel flow pneumatic flow relative to each other and may be arranged 10 electrically in series (as shown), in parallel, or controlled independently.

Cathode air 12 enters stack 10, 10' at cathode inlet 14 and, after flowing across all of the individual cathode surfaces in the stack, exits the stack as spent air 16 at cathode air outlet 18. Fuel gas 20, for example, hydrogen and carbon monoxide from a hydrocarbon reformer (not shown), enters stack 10, 10' at anode inlet 22 and, after flowing across all of the individual anode surfaces in the stack, exits the stack as spent fuel gas 24 at anode outlet 26. Typically, the cathode air is pre-heated before entering the stack, and the fuel gas is also preheated or relatively hot as delivered from the reformer. Both gases, as they flow through the stack, undergo substantial heating, which heat when discharged to the environment as shown in FIG. 1 represents a significant thermodynamic loss and consequent fuel inefficiency. Further, as the gases are progressively heated within the stack, very substantial thermal stresses can be created which can lead to short working lifetimes of stress-sensitive components in the fuel cells.

Further, the air and fuel gases, being passed across the cells in parallel, pass over only a single cathode or single anode surface before being discharged. Because an individual fuel cell reaction is relatively inefficient, a significant amount of fuel remains in the "spent" anode exhaust 24.

EXAMPLE 1

An SOFC stack configured in accordance with FIG. 1 was operated at a current of 0.9 amps/cm$^2$. With a temperature differential across the stack of 150° C. (inlet temperature 650° C., outlet temperature 800° C.), the stack produced 4810 watts of electricity at 0.74 volts/cell, fuel utilization was 43%, stack efficiency was 21.8%, and an additional 1136 watts of heat was released within the stack.

Figure 2:
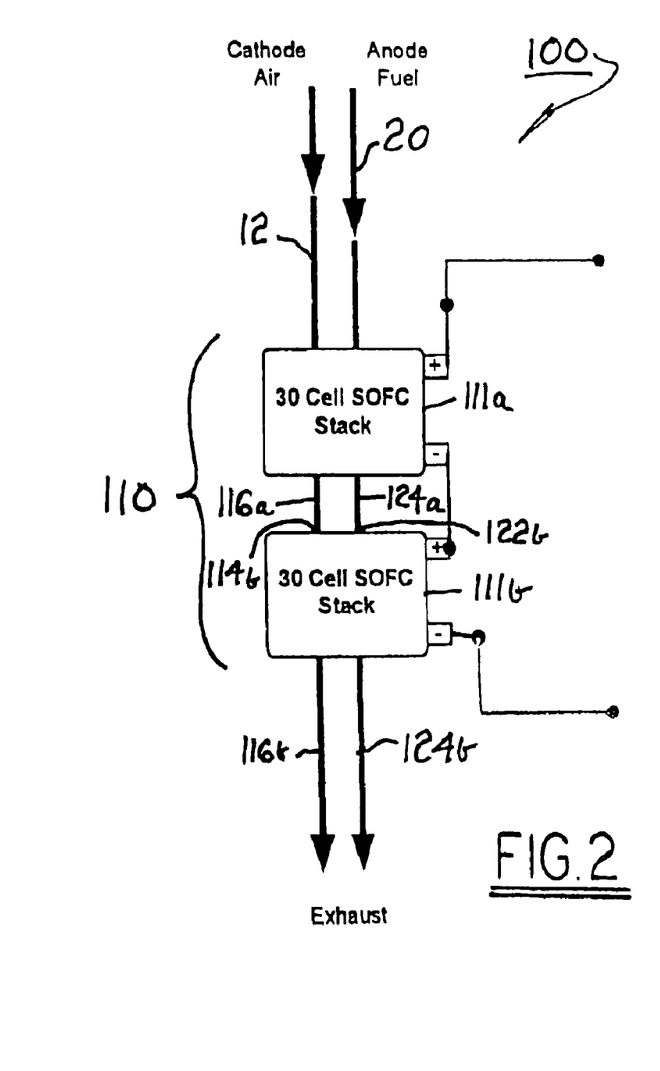
FIG. 2 is a schematic drawing of a first embodiment of a multiple-cell fuel cell stack arrangement in accordance with the invention, comprising a plurality of sub-stacks.

Referring to FIG. 2, in a first embodiment 100 in accordance with the invention, a fuel cell stack 110 having a plurality of individual fuel cell elements, for example, 60 cells as in prior art stack 10, is divided into a plurality of sub-stacks, for example, two sub-stacks 111a,111b each containing 30 fuel cell elements, the two sub-stacks being connected in series electrically. Other numbers of sub-stacks are fully comprehended by the invention, and the numbers of fuel cells may or may not be distributed equally among the sub-stacks.

In accordance with the invention, the cathode exhaust 116a and anode exhaust 124a from first sub-stack 111a are collected and delivered to the respective inlets 114b,122b of sub-stack 111b. It will be seen that anode exhaust 124a has been passed over only 30 anode surfaces in sub-stack 111a and thus has a large remaining fuel content. Similarly, cathode air exhaust 116a has a large remaining oxygen content. Further, the mass flow of air and fuel gas through each cell is doubled with respect to stack 10, which has the advantage of reducing the temperature gradient across each sub-stack by providing additional cooling, thus reducing thermal stresses in the cells, substacks, and stacks.

EXAMPLE 2

An SOFC stack configured in accordance with FIG. 2 was operated at a current of 0.9 amps/cm$^2$.

Sub-stack 111a was operated with a temperature differential of 100° C. (650° C. inlet temperature, 750° C. outlet temperature) and produced 2359 watts of electricity at 0.72 volts/cell. Fuel utilization was 21.8%, stack efficiency was 10.7%, and only 177 watts of heat were rejected into the stack. Note that this is a much lower fuel utilization and stack efficiency than for prior art stack 10.

Sub-stack 111b had an inlet temperature of 750° C. and an outlet temperature of 850° C. Sub-stack 111b produced 2589 watts of electricity at 0.79 volts/cell. Fuel utilization was 28% and the stack efficiency was 15%. The reaction was slightly endothermic, requiring 138 watts of energy from the stack.

Advantages of the novel stack configuration in accordance with the invention (FIG. 2) vs. the prior art configuration (FIG. 1):

a) the novel configuration produced more total electric power, 4948 watts vs. 4810 watts.
b) the novel configuration ran with a substantially reduced temperature gradient across each sub-stack, thus improving stack durability and reducing thermal stresses in the structure.
c) the novel configuration ran with substantially improved net fuel utilization, 49.8% vs. 43%

Regarding the viability of comparisons, the heat exchange between the chemical reactions and the stack structure in all cases was of a magnitude and sign such that if everything were shifted to adiabatic, the comparisons would favor the novel configuration even more.

Figure 3:
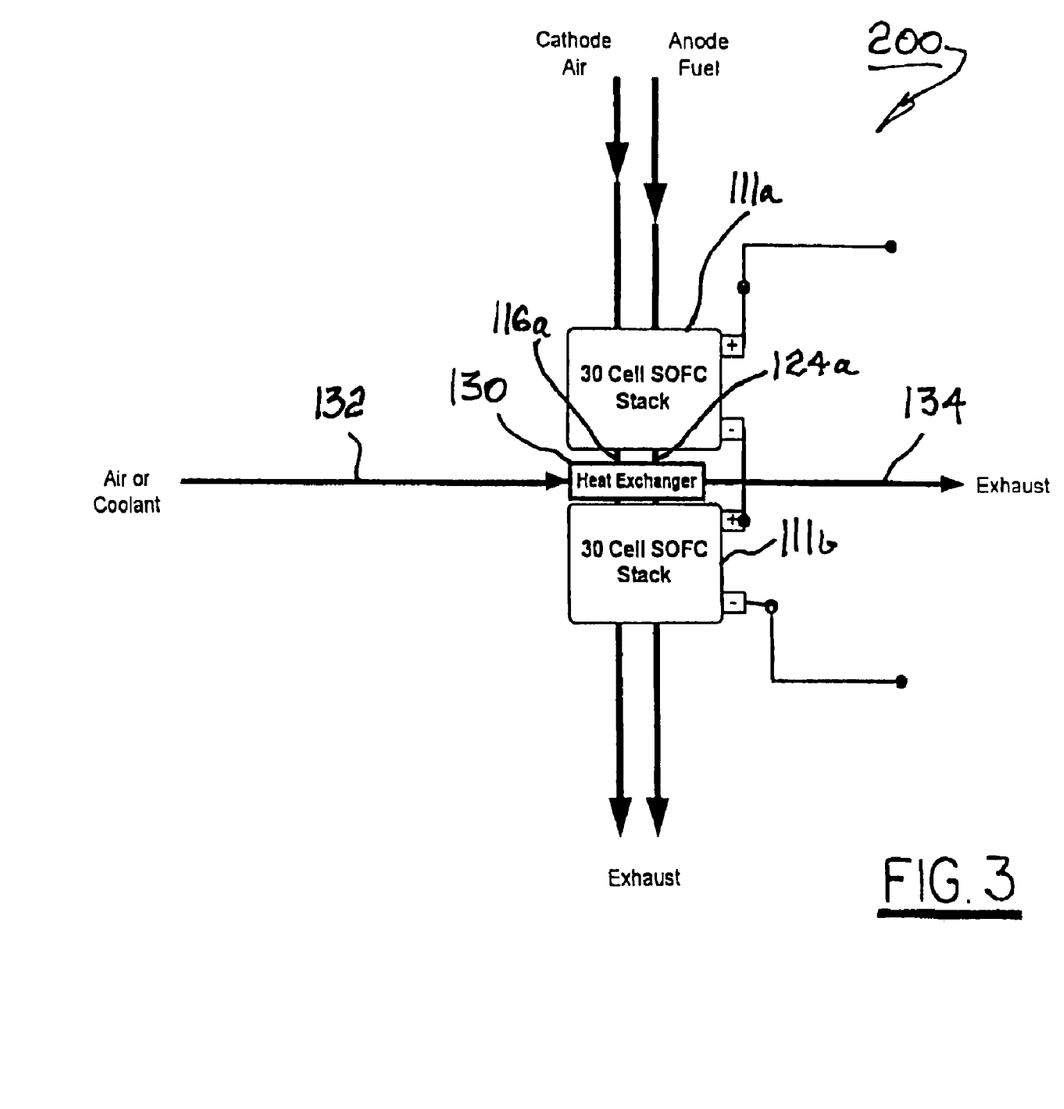
FIG. 3 is a schematic drawing of a second embodiment, showing a first heat exchanger disposed between the sub-stacks.

Referring to FIG. 3, in a second embodiment 200, a first heat exchanger 130 is installed in the flow paths of cathode exhaust 116a and anode exhaust 124a. Heat exchanger 130 may be a single three-way heat exchanger or two separate two-way heat exchangers, as is known in the heat exchanging art; for simplicity of presentation, heat exchanger 130 (and all other heat exchangers herein) is shown as a single unit. Tempered air or other coolant 132 is provided through a first side of exchanger 130 such that the exhaust streams of the first sub-stack are cooled with waste heat 134 moving to the environment or to be used productively elsewhere in the system. This arrangement can permit the two sub-stacks 111a,111b to operate at very similar temperatures, and to do so at the lower end of the viable temperature range. This is advantageous from a materials or durability standpoint although at some sacrifice in thermal and electrical efficiency.

Figure 4:
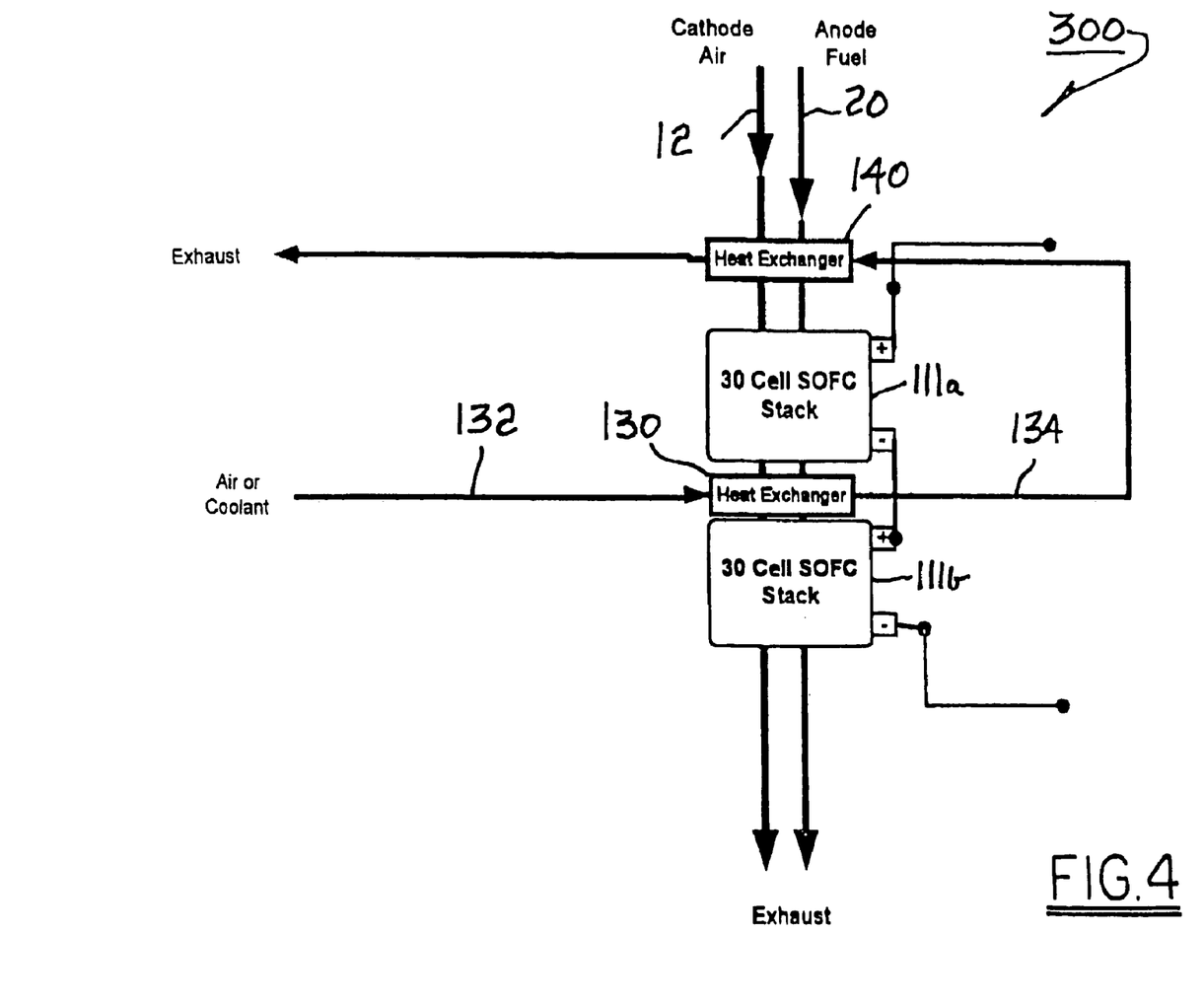
FIG. 4 is a schematic drawing of a third embodiment, showing a second heat exchanger disposed ahead of the first sub-stack.

Referring to FIG. 4, in a third embodiment 300 a second heat exchanger 140 is provided in the entrance streams of cathode air 12 and fuel gas 20. Some or all of waste heat 134 from first heat exchanger 130 is diverted through second heat exchanger 140 to additionally preheat cathode air 12 and fuel gas 20 prior to entry into first sub-stack 111a. Exhaust 134a from second heat exchanger 140 may be released to the environment or diverted for use productively elsewhere in the system.

In Example 2, clearly second sub-stack 111b performed better than first sub-stack 111a, largely because of higher operating temperature. First sub-stack 111a can be shown to operate better if the operating temperature is raised 100° C. (which also raises the inlet and exhaust temperatures 100° C.). Doing so changes the stack reaction from exothermic to slightly endothermic and improves stack efficiency. The net effect if run under adiabatic conditions would be a reduction in temperature gradient across sub-stack 111a.

Thus, the efficiency of a series flow arrangement of sub-stacks 111a,111b can be improved if the sub-stacks are operated under similar thermal regimes, either by simply lowering the inlet temperature of the second sub-stack or by also raising the inlet temperature of the first sub-stack. A highly desirable effect of either approach is a reduction in stack thermal stress.

Figure 4A:
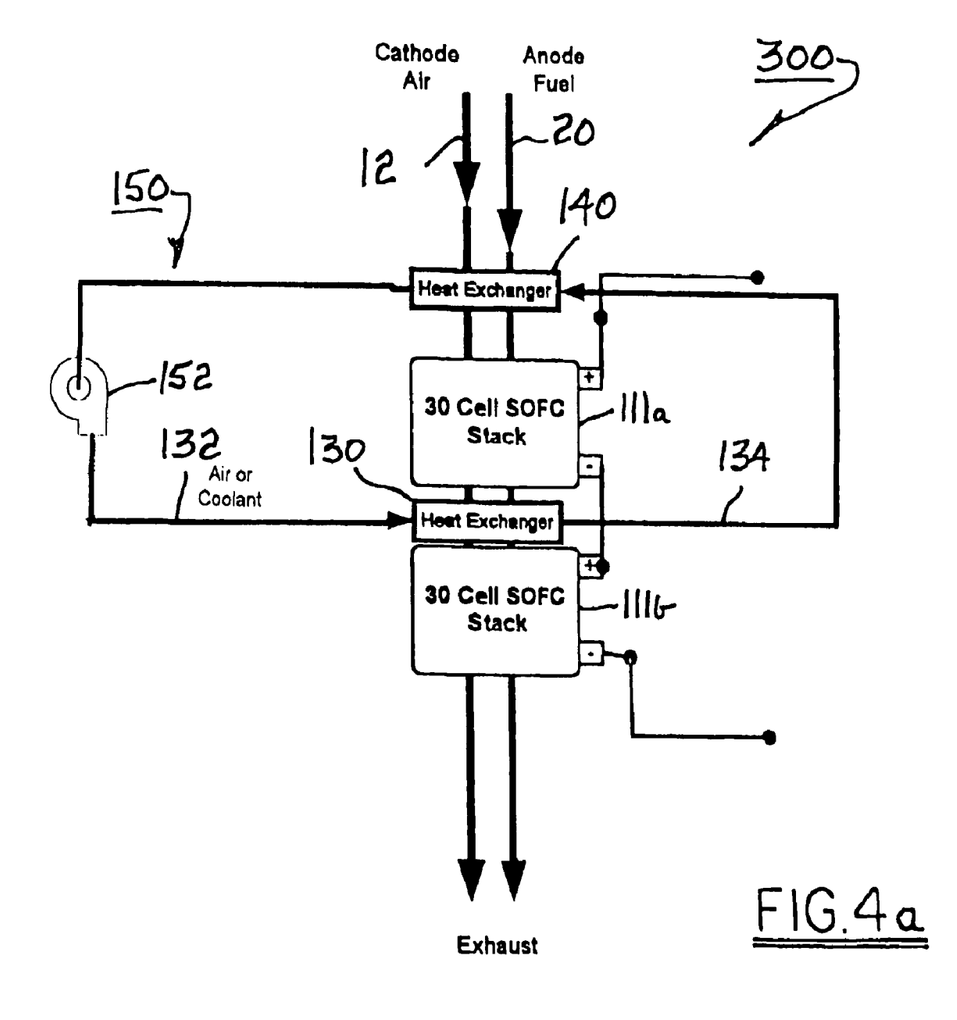
FIG. 4a is a schematic drawing like that shown in FIG. 4, showing a closed cooling system for supplying the heat exchangers.

Referring to FIG. 4a, the cooling system for heat exchangers 130,140 may readily be provided as a closed loop 150 including recirculation means such as a coolant pump or blower 152.

Figure 5:
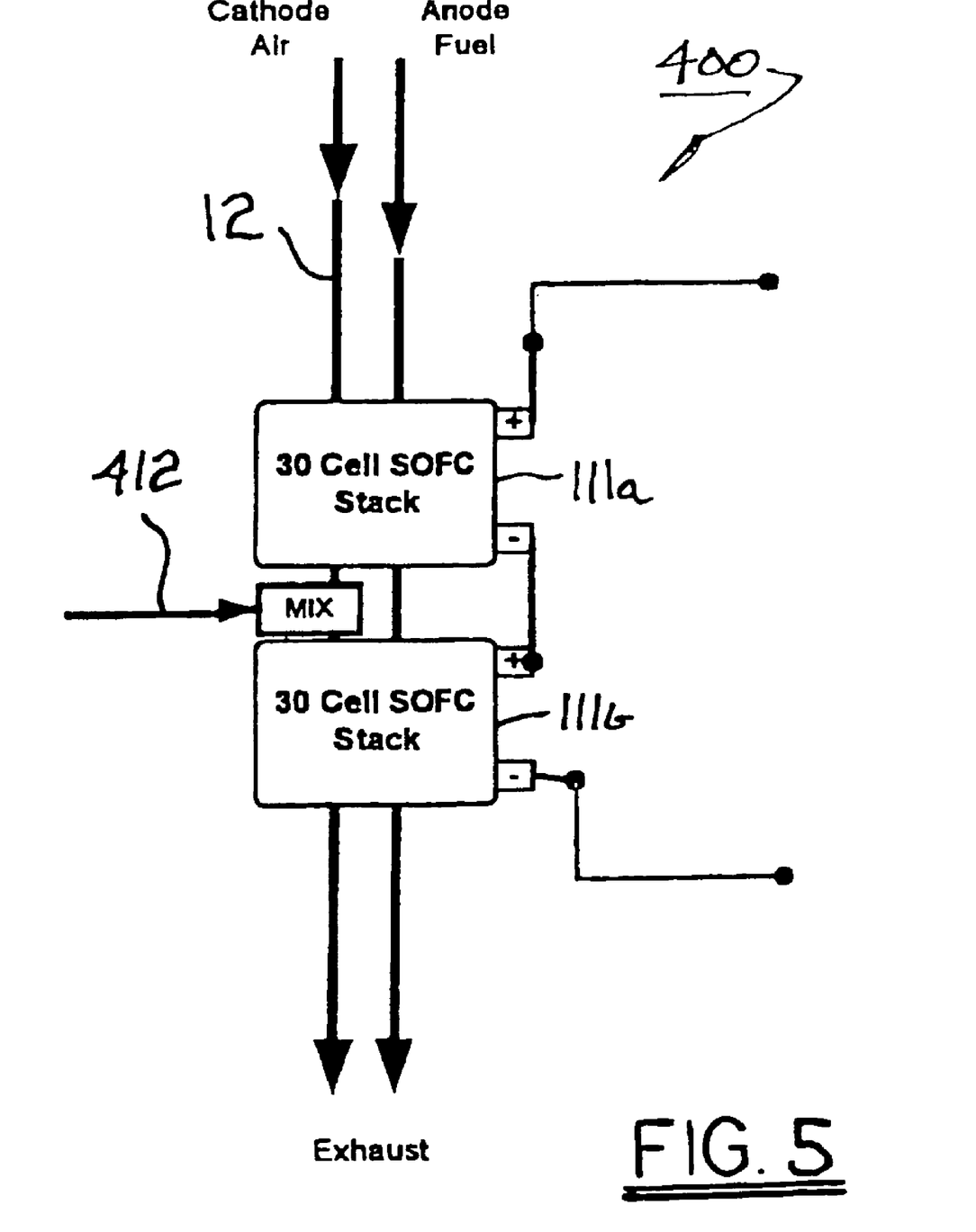
FIG. 5 is a schematic drawing of a fourth embodiment, showing provision of additional cathode cooling air to the cathode inlet of the second sub-stack.

Referring to FIG. 5, in a fourth embodiment 400 a second stream 412 of cathode air 12 is mixed with cathode exhaust air 116a from first sub-stack 111a. Stream 412 is preferably tempered and metered to result in a cathode air inlet stream to second sub-stack 111b sufficient to decrease the temperature gradient across sub-stack 111b. This embodiment does not require either of heat exchangers 130,140 and their associated cooling system(s), but its effect is limited to lowering the temperature of the second sub-stack. A potential disadvantage of this embodiment is that a thermal imbalance is created between the temperatures of the cathode air and the fuel gas entering the second sub-stack, which can create undesirable mechanical stresses therein.

Alternatively, other gasses could supplement or replace second stream 412 in this injection scheme. Most notably, stream 412 could be augmented with oxygen. This would be especially useful if multiple (more than 2) substacks were series flow connected in a substack module. Such gas tailoring or selection could impact the SOFC chemistry in downstream substacks as well as provide additional cooling as already noted.

Figure 6:
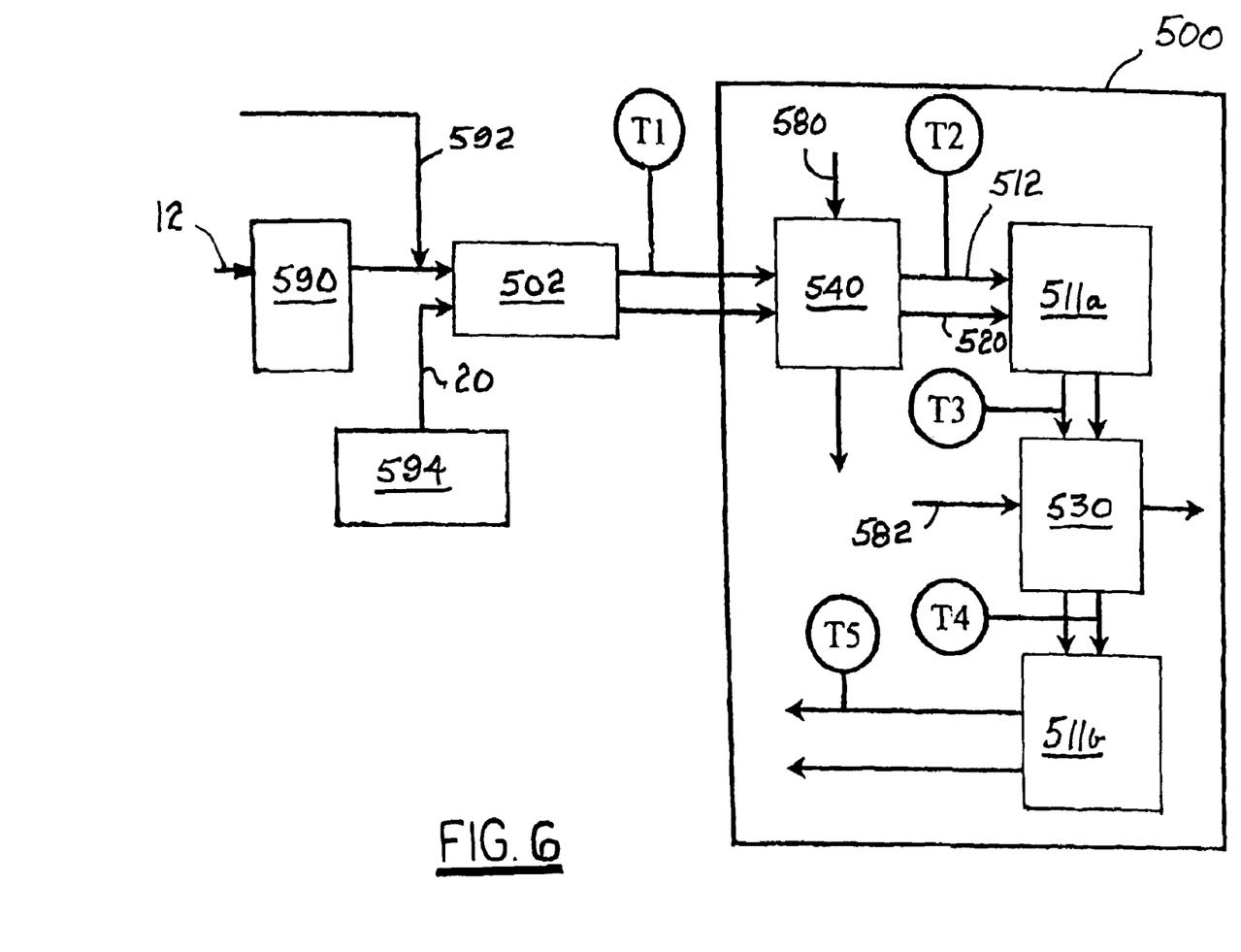
FIG. 6 is a schematic drawing showing a fuel cell module having first and second sub-stacks and first and second heat exchangers, substantially as shown in FIG. 4.

Referring to FIG. 6, a fuel cell stack module 500 in accordance with the invention comprises a first sub-stack 511a, a second sub-stack 511b, a precooler heat exchanger 540 ahead of the first sub-stack, and an intercooler heat exchanger 530 between the sub-stacks, which arrangement is substantially as described above. In addition, module 500 includes a temperature sensor T2 in the gas flowstream between precooler 540 and first sub-stack 511a to monitor the temperature of the cathode air 512 entering the sub-stack, which may be equal to the temperature of fuel gas 520 if their respective temperatures have been previously equalized to a temperature T1 during passage of the gases through opposite sides of an equalizer heat exchanger 502 outside module 500. A first coolant 580 may be passed through precooler 540 to adjust entry temperature T2 as desired. A temperature sensor T3 monitors the temperature of the gas exhausts from first sub-stack 511a, and a temperature sensor T4 monitors the entry temperature of gases into second sub-stack 511b. A second coolant 582 may be passed through intercooler 530 to adjust entry temperature T4 as desired, which generally should be about the same as temperature T2. Thus, when the two sub-stacks contain the same number of fuel cells, the performance and efficiency of the two stacks should be about the same. Sensors T2 and T3 permit monitoring of the temperature change across first sub-stack 511a, and sensors T4 and T5 permit monitoring of the temperature change across second sub-stack 511b.

Figure 7:
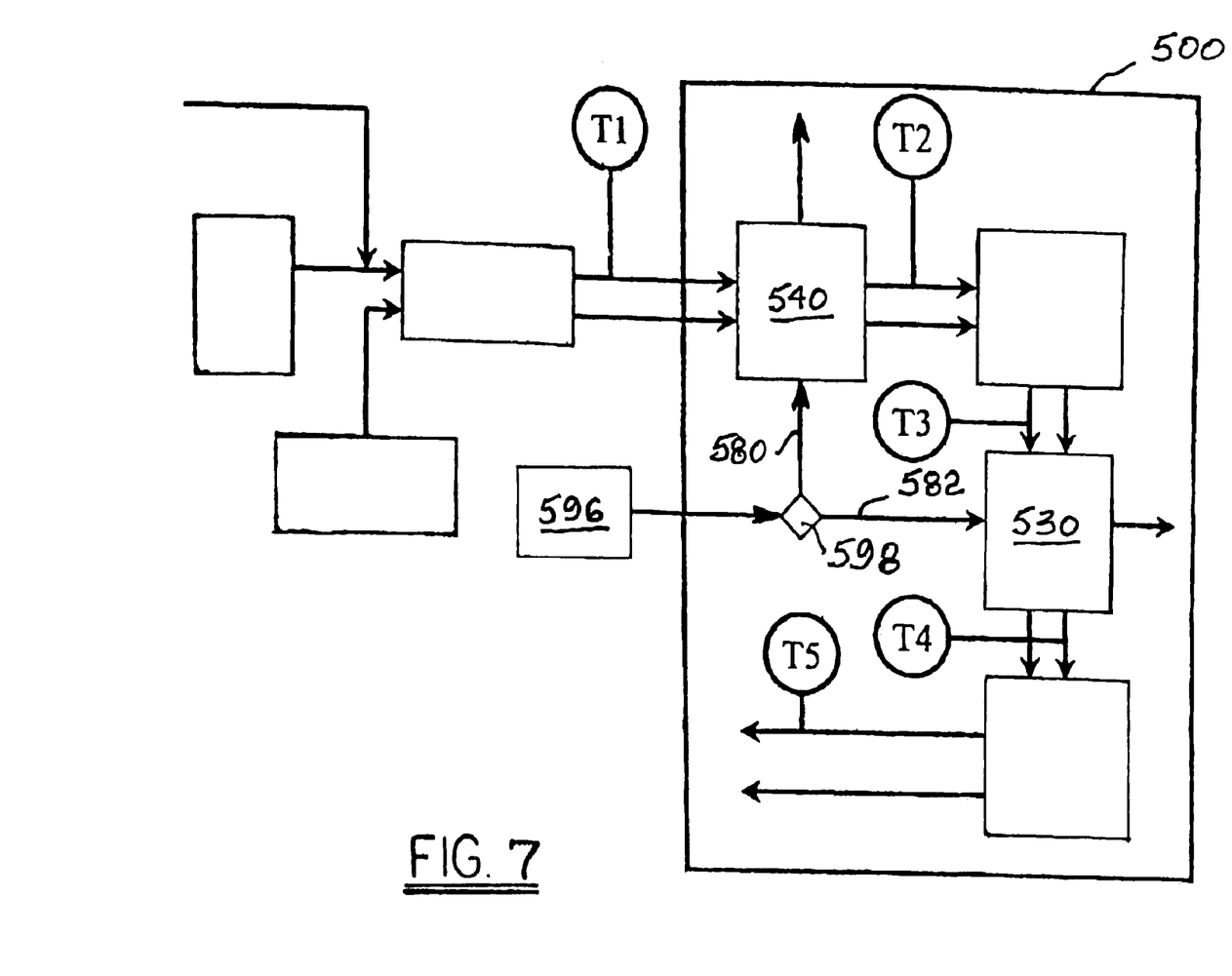
FIG. 7 is a schematic drawing like that shown in FIG. 6, showing a distributed cooling air system for providing cooling air to the first and second heat exchangers.

In a currently preferred mode of operation, cathode air 12 is passed through a cathode air heat exchanger 590 in known fashion, which may be heated by exhaust gas at temperature T5, for example, and may be further tempered by addition of bypass air 592. Fuel gas 20 is supplied as by a hydrocarbon reformer 594 in known fashion. The temperature and flow rate of first coolant 580 is adjusted to provide a predetermined temperature T2 of cathode air and fuel gas at the entrance to first sub-stack 511a. The temperature and flow rate of second coolant 582 is adjusted to provide a predetermined temperature T4 of cathode air and fuel gas at the entrance to second sub-stack 511b. First and second coolants 580,582 may or may not be identical in substance, temperature, or flow rate. Referring to FIG. 7, a coolant air plenum 596 may be used to supply both coolants 580,582 to module 500 from a common source at a common temperature, the individual flow rates of coolant being governed by a single proportional valve 598.

Figure 8:
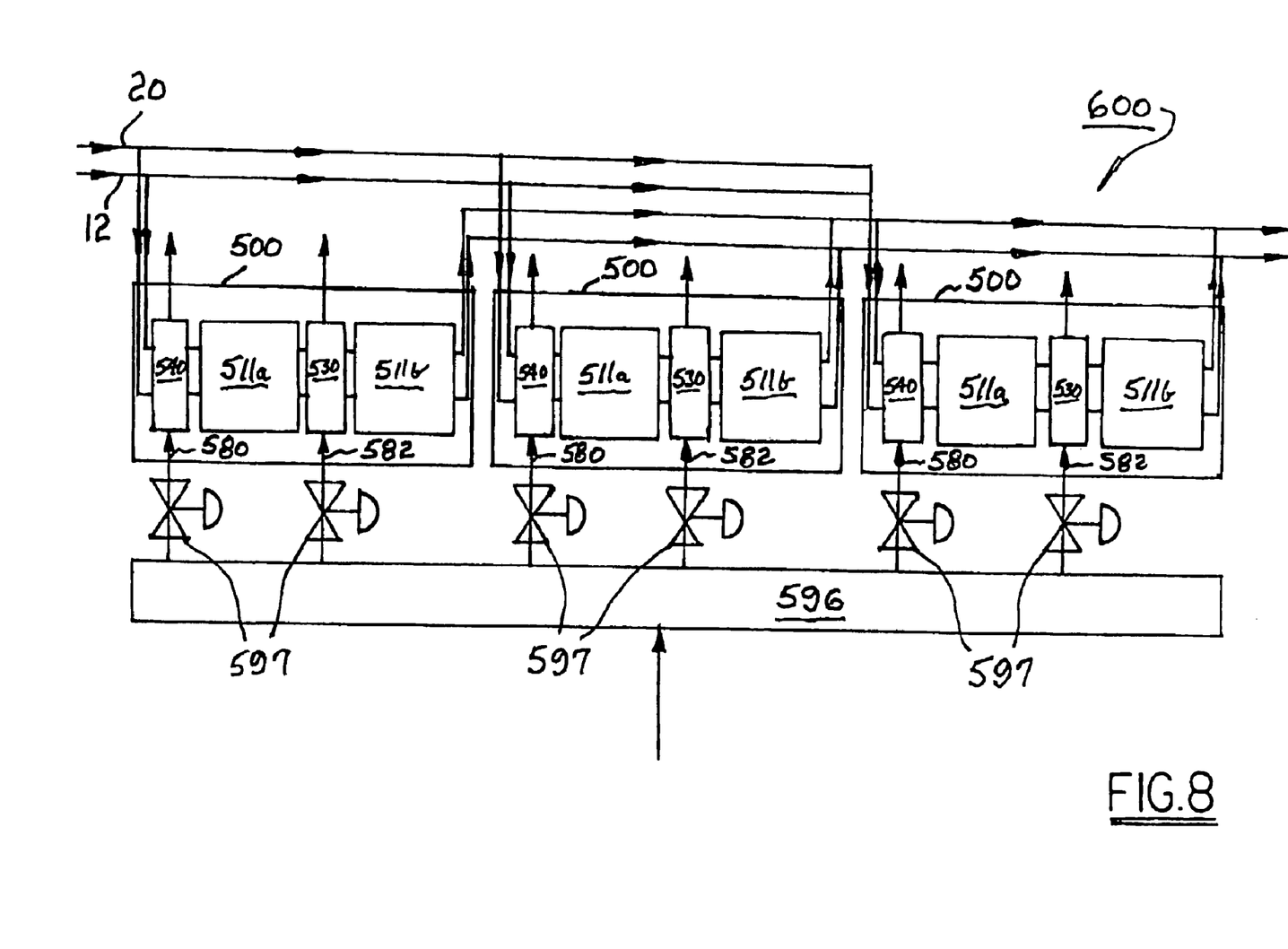
FIG. 8 is a schematic drawing of a fuel cell assembly comprising three modules, such as is shown in FIG. 7, and a cooling air system for supplying regulated air flow to the heat exchangers.

Referring to FIG. 8, a plurality of fuel cell stack modules 500, in this example three such modules, may be grouped together in an arrangement 600 having several legs of series sub-stacks connected in flow parallel to cathode air 12 and fuel gas 20. Because the optimal operating temperatures of the various first sub-stacks 511a and second sub-stacks 511b may differ slightly, the plurality of coolant flows 580,582 may be supplied from a common plenum 596 and individually flow-controlled by a plurality of control valves 597.

While the substacks in the various embodiments, in accordance with the invention, are shown connected electrically in series, it is understood that they could alternatively be connected electrically in parallel (controlling voltage or total current) or operated electrically independent (controlling voltage or current for each substack).

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell stack assembly comprising:
    a plurality of fuel cells arranged into a plurality of sub-stacks, wherein respective cathode and anode gas outlets of a first sub-stack are connected serially to respective cathode and anode gas inlets of a second sub-stack such that cathode air exhaust and anode fuel gas exhaust from said first sub-stack are the respective oxidant and fuel for said second sub-stack;
    a first heat exchanger disposed between said first sub-stack and said second sub-stack for changing the temperature of said cathode air exhaust and said anode fuel gas exhaust prior to entry thereof into said second sub-stack; and
    a second heat exchanger disposed ahead of said first sub-stack for changing the temperature of cathode air and anode fuel gas prior to entry thereof into said first sub-stack, wherein a heat exchange fluid is directed through said first and second heat exchangers, wherein said heat exchange fluid is separate from said cathode air and anode fuel.

2. A fuel cell stack assembly in accordance with claim 1 wherein said fuel cells are solid-oxide fuel cells.

3. A fuel cell stack assembly in accordance with claim 1 adapted to receive additional cathode air supplied to said cathode gas inlet of said second sub-stack.

4. A fuel cell stack assembly in accordance with claim 1 wherein said heat exchange fluid includes a first coolant and a second coolant, and wherein said first heat exchanger is connected to said first coolant and said second heat exchanger is connected to said second coolant.

5. A fuel cell stack assembly in accordance with claim 1 wherein a coolant outlet of said first heat exchanger is connected to a coolant inlet of said second heat exchanger.

6. A fuel cell stack assembly in accordance with claim 1 wherein said combination of said first sub-stack, said second sub-stack, and at least one of said first heat exchanger and said second heat exchanger defines a fuel cell stack assembly module.

7. A fuel cell stack assembly in accordance with claim 6 wherein said module further comprises:
    a) a first temperature sensor disposed adjacent an inlet end of said first sub-stack for sensing the temperature of at least one of said cathode air and said fuel gas entering said first sub-stack;
    b) a second temperature sensor disposed adjacent an outlet end of said first sub-stack for sensing the temperature of at least one of said cathode air exhaust and said fuel gas exhaust leaving said first sub-stack:
    c) a third temperature sensor disposed adjacent an inlet end of said second sub-stack for sensing the temperature of at least one of said cathode air and said fuel gas entering said second sub-stack; and
    d) a fourth temperature sensor disposed adjacent an outlet end of said second sub-stack for sensing the temperature of at least one of said cathode air exhaust and said fuel gas exhaust leaving said second sub-stack.

8. A fuel cell stack assembly in accordance with claim 1 wherein said plurality of said fuel cells are divided approximately equally between two sub-stacks.

9. A fuel cell arrangement comprising a plurality of individual fuel cell assembly modules as claimed in claim 6, said modules being connected in flow parallel to a common supply for cathode air, and said modules being connected in flow parallel to a common supply for fuel gas, and said heat exchangers being connected to a common supply for heat exchange fluid.

10. A fuel cell arrangement in accordance with claim 9 wherein flow rate of coolant from said common supply to each of said heat exchangers is regulated independently.

11. In a fuel cell stack assembly having first and second sub-stacks, a method for operating said assembly comprising the steps of:
    a) directing cathode air exhaust from a cathode air exhaust outlet of said first sub-stack to a cathode air inlet of said second sub-stack;
    b) directing anode fuel gas exhaust from an anode fuel gas exhaust outlet of said first sub-stack to a fuel gas inlet of said second sub-stack;
    c) providing a first heat exchanger having at least first and second sides
    d) directing a first heat exchange fluid through a first side of said first heat exchanger;
    e) directing said cathode air exhaust and said anode fuel gas exhaust through a second side of said first heat exchanger between said first sub-stack outlets and said second sub-stack inlets, wherein said first heat exchange fluid is separate from said cathode air exhaust and said anode fuel gas exhaust;
    f) providing a second heat exchanger having at least first and second sides;
    g) directing a second heat exchange fluid through a first side of said second heat exchanger; and
    h) directing cathode air and anode fuel gas through a second side of said second heat exchanger before entry thereof into said first sub-stack, wherein said second heat exchange fluid is separate from said cathode air and anode fuel gas.

12. A fuel cell stack assembly in accordance with claim 4 wherein said first coolant and said second coolant are different substances.

13. A method in accordance with claim 11 further comprising the step of mixing additional cathode air with said first sub-stack cathode air exhaust at said cathode air inlet to said second sub-stack.

14. A method in accordance with claim 11 wherein said first side of said first heat exchanger and said first side of said second heat exchanger are connected in series such that said first and second heat exchange fluids are the same and such that heat exchange fluid leaving said first heat exchanger is directed through said second heat exchanger.

15. A method in accordance with claim 11 comprising the further step of controlling the flow rates and temperatures of said first and second heat exchange fluids such that a first operating temperature gradient through said first sub-stack is about equal to a second operating temperature gradient through said second sub-stack.

16. A method in accordance with claim 13 wherein said additional cathode air comprises up to 100% of a gas other than cathode air.

17. A method in accordance with claim 16 wherein said gas other than cathode air is oxygen.

* * * * *